Patented May 24, 1932

1,860,164

UNITED STATES PATENT OFFICE

WILLIAM C. ARSEM, OF SCHENECTADY, NEW YORK, ASSIGNOR TO GENERAL ELECTRIC COMPANY, A CORPORATION OF NEW YORK

SYNTHETIC RESINS

No Drawing. Application filed July 27, 1929. Serial No. 381,692.

This invention relates to the production of that type of synthetic resins which are known as "alkyd resins", and particularly to the use of certain catalysts in the production of such resins.

Alkyd resins include all those complexes resulting primarily from the interreaction of a polyhydric alcohol and a polybasic acid.

Such resins can be produced without the use of a catalyst by simply heating the components together. However, the reaction, which is chiefly one of esterification, is rather slow like most uncatalyzed esterifications. Esterification can ordinarily be hastened by the use of a mineral acid as a catalyst but when a polyhydric alcohol is to be esterified the method is sometimes disadvantageous because of the action of the catalyst on the reaction ingredients.

I have found that sulphonic acids in general are catalysts capable of hastening the formation of an alkyd resin, and have also found that I can use as such catalysts a wide range of acids containing the group —$SO_3H$. Not only is the formation of the fusible stage product accelerated by the use of such a catalyst but also the conversion of this product to an infusible stage or state also is accelerated.

In carrying out my invention I employ only a small amount of the catalyst. For example, I may employ from about 1 to about 5 percent by weight of the catalyst in carrying out my process. I may add the catalyst to the ingredients before the reaction begins or to the product at any stage of the reaction or at any point of the conversion by heating of the resin to the infusible form.

The use of a catalyst of the type which I employ in carrying out my invention accelerates the formation of the resin to a very great extent. The time required for producing the resin with the aid of such a catalyst has in some cases been cut down to as much as 1/6 of the time required for the formation of the resin by heating without a catalyst. To cite one instance: in making a glycerine-phthalic anhydride resin at 160° C. without a catalyst the time required to reach the fusible soluble stage is 400 minutes whereas if 2% of 4-aminotoluene-2-sulphonic acid is added at the beginning, the time required is reduced to 58 minutes.

As examples of my invention I cite the following:

Example 1.—100 kg. of glycerine, 200 kg. phthalic anhydride, 6 kg. 4-aminotoluene-2-sulphonic acid are heated at 160° C. to produce a fusible soluble resin. This resin is applied in solution as a lacquer or formed or cast in a mold and heated at 160° to 200° C. to convert it to the infusible form.

Example 2.—92 kg. of glycerine, 148 kg. phthalic anhydride, 9.6 kg. of 1-naphthylamine-4-sulphonic acid are heated as in Example 1 to produce a fusible or infusible resin.

In preparing the resins cited in Examples 1 and 2 if the mixture is heated without agitation the fusible stage will be reached at 160° C. in one hour and the product in thin films will become infusible in one hour at 180° C. However, without the catalyst the time for reaching the fusible stage at 160° C. will be 6 to 7 hours while the product in thin films will become infusible at 180° C. in 1½ hours.

Example 3.—92 kg. of glycerine and 148 kg. of phthalic anhydride are heated at 200 to 210° C. until gas evolution is slight but the product is still fusible, which will require about 1 hour.

141 kg. of oleic acid and 37 kg. of phthalic anhydride are now added to the mixture and heated at 200 to 215° C. for about one hour during which the previously separate layers mix and the product becomes homogeneous after which heating is continued for an hour. There is now added 1 percent by weight of benzene sulphonic acid as a catalyst and the mixture is heated 2 to 2½ hours at 160° C. to produce a soft rubbery fusible product. (Without a catalyst this stage of the reaction requires 15 to 20 hours at 160° C.). This fusible product becomes infusible but remains flexible when baked for 1½ hours at 160° C. after deposition as a film from its solution in toluene, whereas in the absence of the catalyst the time required is 10 to 15 hours.

In order to further illustrate the scope of my invention and to show the advantage of using a catalyst of the type which I have discovered, the following further examples are given:

Batches were made up as follows:
6.5 grams of glycerine
14.8 grams of phthalic anhydride
0.4 grams of catalyst from the following list:

| | Hrs. to fusible stage at 160° C. | Hrs. to gel. from start |
|---|---|---|
| A. 4-aminotoluene-2-sulphonic acid | 3 | 5½ |
| B. 2-aminotoluene-4-sulphonic acid | 3 | 5½ |
| C. 2-aminotoluene-5-sulphonic acid | 3 | 5½ |
| D. 1-amino-2-naphthol-4-sulphonic acid | 3 | 5½ |
| E. 2-aminophenol-4-sulphonic acid | 3 | 5½ |
| F. 1-naphthylamine-5-sulphonic acid | 3 | 5½ |
| G. 1-naphthylamine-4-sulphonic acid | 3 | 5½ |
| H. Benzene sulphonic acid | 2 | 4½ |
| J. m-nitrobenzene sulphonic acid | 1 | 3 |
| K. 2-5-dichlorbenzene sulphonic acid | 2 | 3 |
| L. Aminosulphonic acid | 2 | 4½ |
| M. Ethane sulphonic acid | ¼ (at 175° C.) | 2 |

Each batch was heated in a shallow aluminum dish in an oven without agitation except occasional stirring. A sample run similarly, but without the catalyst gave a fusible sticky solid after 5½ hours and had not yet reached the condition of a solid fusible resin. If agitation is employed, the time for both stages is less. For example, when 184 grams of glycerine and 444 grams of phthalic anhydride are heated at 160° C. with agitation 400 minutes are required to reach the fusible stage, while if to the same size batch there are added 12.5 grams of 4-aminotoluene-2-sulphonic acid, only 58 minutes are required.

While I have given in most of my examples glycerine and phthalic anhydride as the alcohol and acid used, my invention is by no means limited to the use of these substances. For example, as polyhydric alcohols I may use such alcohols as glycol, diethylene glycol, mannitol and others. As polybasic acids I may use malic acid, tartaric acid, citric acid and others. As monobasic acids I may use acetic, propionic and higher members of the acetic acid series; acrylic acid, oleic acid and other members of the same series, and other high unsaturated acids such as linolic acid, linolenic acid, clupanodonic acid, elaostearic acid and mixtures thereof.

It will be obvious to those skilled in the art that my invention is not limited to the particular compounds cited. I have disclosed examples of organic sulphonic acids of both the aromatic and aliphatic series, the use of an inorganic sulphonic acid, and organic aromatic-amino-sulphonic acids. Likewise it will be obvious to those skilled in the art that organic aliphatic amino-sulphonic acids may be applicable as catalysts in carrying out the process of my invention, and it is intended to embrace such compounds within the scope of my invention.

What I claim as new and desire to secure by Letters Patent of the United States, is:

1. The process of preparing an alkyd resin which comprises heating the resin ingredients in the presence of an organic acid containing an —$SO_3H$ group, as the acid group.

2. The process of preparing an alkyd resin which comprises heating the resin ingredients with a small amount of an amino sulphonic acid.

3. The process of preparing a fusible resinous product of the alkyd type which consists in heating the resin ingredients in the presence of a sulphonic acid.

4. The process of preparing a fusible resinous product of the alkyd type which consists in heating the resin ingredients with a small amount of an organic amino sulphonic acid.

5. The process of preparing a heat convertible fusible synthetic resin which consists in heating a mixture of a polyhydric alcohol and an organic polybasic acid with from 1 to 5% by weight of an organic sulphonic acid.

6. The process of preparing a resinous condensation product of the polyhydric alcohol-polybasic acid type which comprises heating a mixture of a polyhydric alcohol and an organic polybasic acid with from 1 to 5% by weight of an organic amino sulphonic acid.

7. The process of accelerating the production of a resinous condensation product of the alkyd resin type which consists in heating a mixture of the resin ingredients with about 2% by weight of an organic sulphonic acid.

8. The process which consists in heating a polyhydric alcohol with an organic polybasic acid in the presence of an organic sulphonic acid which may be added at any stage of the reaction, to form a fusible resin, and then continuing the heating to convert the product to the infusible state.

9. The process which consists in heating a polyhydric alcohol with a mixture of organic acids at least one of which is polybasic, in the presence of an organic sulphonic acid which may be added at any stage of the reaction, to form a fusible resin, and then continuing the heating to convert the product to the infusible state.

10. A composition of matter comprising a fusible soluble condensation product of a polyhydric alcohol and an organic polybasic acid containing from 1 to 5% of an organic sulphonic acid and heat convertible to the infusible state.

11. A composition of matter comprising a fusible resinous reaction product of a polyhydric alcohol with more than one organic acid, at least one of which is polybasic, containing from 1 to 5% of an organic sulphonic acid, and heat convertible to the infusible state.

12. A fusible heat-convertible resinous product of glycerine and phthalic anhydride containing 1 to 5% of an organic sulphonic acid.

13. The process of preparing an infusible alkyd resin from the fusible product which comprises heating the latter in the presence of an organic acid containing an $-SO_3H$ group, as the acid group.

14. The process of preparing an infusible alkyd resin from the fusible product which comprises heating the latter with a small amount of an amino sulphonic acid.

15. The process of preparing an infusible alkyd resin from the fusible product which consists in heating the latter in the presence of a sulphonic acid.

16. The process of preparing an infusible alkyd resin from the fusible product which consists in heating the latter with a small amount of an organic amino sulphonic acid.

17. The process of preparing an infusible alkyd resin from the fusible product which consists in heating the latter with from 1 to 5% by weight of an organic sulphonic acid.

18. The process of preparing an infusible alkyd resin from the fusible product which consists in heating the latter with from 1 to 5% by weight of an organic amino sulphonic acid.

19. The process of accelerating the formation of an infusible alkyd resin from the fusible product which consists in heating the latter with about 2% by weight of an organic sulphonic acid.

20. The process of accelerating the formation of an infusible alkyd resin from the fusible product which consists in heating the latter with about 2% by weight of an organic amino sulphonic acid.

In witness whereof, I have hereunto set my hand this 25th day of July 1929.

WILLIAM C. ARSEM.